(No Model.)
E. S. SILL.
BRAKE FOR BICYCLES.
No. 519,742. Patented May 15, 1894.
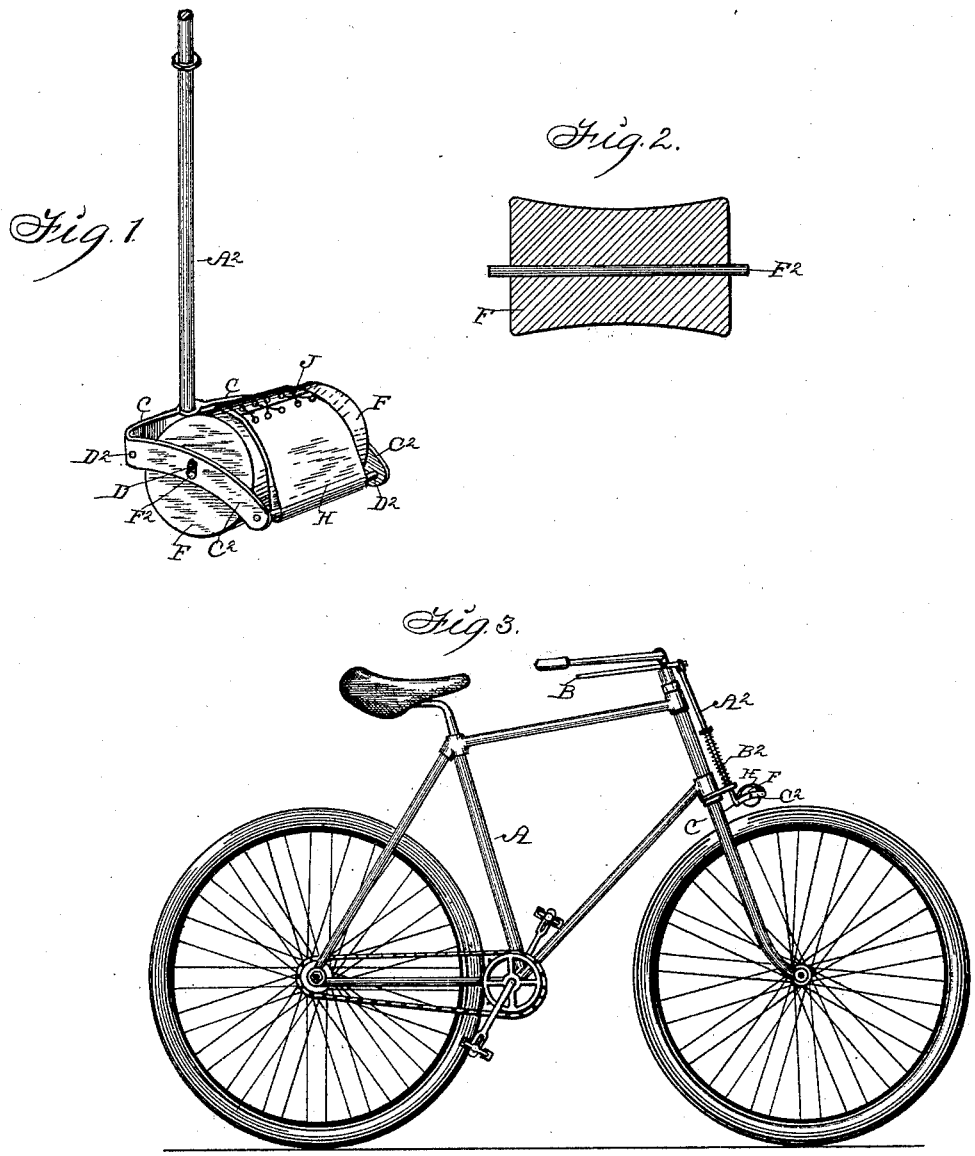
Witnesses:
R. H. Orwig
J. Ralph Orwig
Inventor: Elmer S. Sill,
By Thomas G. Orwig, Attorney.
THE NATIONAL LITHOGRAPHING COMPANY,
WASHINGTON, D. C.

UNITED STATES PATENT OFFICE.

ELMER S. SILL, OF MASSENA, IOWA.

BRAKE FOR BICYCLES.

SPECIFICATION forming part of Letters Patent No. 519,742, dated May 15, 1894.

Application filed June 26, 1893. Serial No. 478,900. (No model.)

*To all whom it may concern:*

Be it known that I, ELMER S. SILL, a citizen of the United States of America, residing at Massena, in the county of Cass and State of Iowa, have invented an Improved Brake for Bicycles, of which the following is a specification.

The object of my invention is to produce an improved roller brake, having simple, strong and durable means whereby friction may be applied to the roller, to hold the roller more firmly than has been done heretofore, and my object is further, to produce a roller that will engage the tire firmly and not slip relative thereto.

With these ends in view, my invention consists in details of construction, arrangement and combination of the various parts of the device, as hereinafter set forth, pointed out in my claims and illustrated in the accompanying drawings, in which—

Figure 1 is a perspective view of the brake connected with a brake rod. Fig. 2 is a transverse sectional view of the roller. Fig. 3 is a side view of the complete brake applied to a bicycle.

Referring to the accompanying drawings, the reference letter A is used to designate the bicycle, $A^2$ a brake rod slidingly mounted on the front of the said frame and connected with a lever B, whereby it may be manually operated, $B^2$ being a coil spring applied thereto in the usual manner to normally hold the rod elevated. At the lower end of the said rod is a fork C, extended outwardly, then forwardly, the sides at $C^2$ being parallel with each other and preferably slightly curved, to approximately conform to the shape of the bicycle wheel. The central portions of said side pieces have the vertical slots D formed therein and at their forward and rear ends are the cross pieces or bars $D^2$, for purposes hereinafter set forth.

F designates a roller, preferably made of wood and mounted on, or fixed to a shaft $F^2$ that is adapted to slide vertically in the slots D.

H is a friction device, composed of a flexible strap, preferably made of leather and passed over the cross pieces or bars and having its ends brought together at the top and central portion of the roller and secured together by means of the lacing J.

In practical operation, it will be seen that when the brake rod is depressed, the concave surface of the roller will engage the wheel tire and be rotated thereby and as the said rod is further depressed, the roller will be forced upwardly into engagement with the friction strap and inasmuch as said strap engages a large surface of the roller, a comparatively slight pressure upon the brake rod will materially retard the rotation of the said roller, and as the pressure of the roller upon the tire is in direct proportion to the pressure of the friction device against the roller a strong and easily operated brake is produced.

Having thus described my invention, what I claim as new therein, and desire to secure by Letters Patent of the United States therefor, is—

1. An improved brake for bicycles, comprising a suitable brake rod, means for manually operating the same relative to the wheel tire, a roller mounted in the lower end of said rod and adapted to be brought into engagement with the wheel tire, a flexible band above the said roller and means whereby said band and roller may be brought into contact with each other when the roller is in engagement with the wheel tire, substantially as, and for the purposes, stated.

2. An improved bicycle brake, comprising the following elements, in combination, to wit, a suitable brake rod adapted to be manually operated relative to a wheel tire, a roller mounted in a support fixed to the lower end of said rod and capable of a limited vertical movement relative to the said support, a flexible band attached to the said support on opposite sides of the roller to be engaged by said roller, for the purposes stated.

3. An improved bicycle brake, comprising the following elements, in combination, to wit, a brake rod attached to a bicycle and adapted to be manually operated in the direction of the wheel, a spring arranged to normally hold it away from the wheel, a fork attached to the lower end of said brake rod, having the vertical slots therein, cross pieces at the ends of said fork, a roller having a
5 concave surface mounted on an axle extended through said slots, a flexible band passed over the said cross pieces and having its ends brought together and adjustably connected at the top of the roller, substantially as, and for the purposes, stated.

ELMER S. SILL.

Witnesses:
T. CUSIC,
J. TRIPLETT.